United States Patent
Kim et al.

(10) Patent No.: US 8,204,311 B2
(45) Date of Patent: Jun. 19, 2012

(54) METHOD AND APPARATUS FOR SHOULDER-LINE DETECTION AND GESTURE SPOTTING DETECTION

(75) Inventors: Hye Jin Kim, Incheon (KR); Ho Sub Yoon, Daejeon (KR); Do Hyung Kim, Daejeon (KR); Jae Yeon Lee, Dejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1347 days.

(21) Appl. No.: 11/673,696

(22) Filed: Feb. 12, 2007

(65) Prior Publication Data

US 2008/0037875 A1 Feb. 14, 2008

(30) Foreign Application Priority Data

Aug. 14, 2006 (KR) ........................ 10-2006-0076870

(51) Int. Cl.
*G06K 9/48* (2006.01)
(52) U.S. Cl. ........ 382/190; 345/419; 345/667; 345/621; 382/100; 382/103; 382/162; 382/199; 382/205; 715/863
(58) Field of Classification Search ........................ None
See application file for complete search history.

(56) References Cited

U.S. PATENT DOCUMENTS

| | | | |
|---|---|---|---|
| 5,771,307 A * | 6/1998 | Lu et al. | 382/116 |
| 5,774,591 A * | 6/1998 | Black et al. | 382/236 |
| 5,802,361 A * | 9/1998 | Wang et al. | 382/217 |
| 6,181,818 B1 * | 1/2001 | Sato et al. | 382/170 |
| 6,490,534 B1 * | 12/2002 | Pfister | 702/94 |
| 6,546,117 B1 * | 4/2003 | Sun et al. | 382/103 |
| 6,681,031 B2 * | 1/2004 | Cohen et al. | 382/103 |
| 6,885,761 B2 * | 4/2005 | Kage | 382/118 |
| 7,321,668 B2 * | 1/2008 | Horie et al. | 382/103 |
| 7,502,491 B2 * | 3/2009 | Shirai et al. | 382/107 |
| 7,593,552 B2 * | 9/2009 | Higaki et al. | 382/118 |
| 2003/0099397 A1 * | 5/2003 | Matsugu et al. | 382/173 |
| 2003/0138130 A1 * | 7/2003 | Cohen et al. | 382/103 |
| 2005/0143183 A1 * | 6/2005 | Shirai et al. | 473/151 |
| 2006/0034510 A1 * | 2/2006 | Kim | 382/168 |
| 2007/0122039 A1 * | 5/2007 | Zhang et al. | 382/199 |

FOREIGN PATENT DOCUMENTS

| | | |
|---|---|---|
| KR | 10-2001-0062767 | 7/2001 |
| KR | 1020030050617 A | 6/2003 |
| KR | 10-2004-0072286 | 8/2004 |
| KR | 1020060031834 A | 4/2006 |
| KR | 10-2006-0037979 | 5/2006 |

* cited by examiner

*Primary Examiner* — John Lee
(74) *Attorney, Agent, or Firm* — Ladas & Parry LLP

(57) ABSTRACT

A gesture spotting detection method and apparatus employ a shoulder-line algorithm. The shoulder-line detecting method recognizes a GSD calling gesture that occurs in a shoulder-line, head or higher part in a remote distance or a short distance, although a user does not have a fixed posture. In the method, an image of people is received, and skin information of a person in the image is detected to detect a face area. Then, the cloth color information of the person is modeled from the inputted image to detect a cloth area. An external space is defined from the image based on the body space area, and an edge is extracted from the image based on the body space and the external space. Then, shoulder-line information is acquired based on an energy function obtained based on the body space, the external space, and the edge.

16 Claims, 5 Drawing Sheets

METHOD AND APPARATUS FOR SHOULDER-LINE DETECTION AND GESTURE SPOTTING DETECTION

CLAIM OF PRIORITY

This application claims the benefit of Korean Patent Application No. 2006-76870 filed on Aug. 14, 2006 in the Korean Intellectual Property Office, the disclosure of which is incorporated herein by reference.

BACKGROUND OF THE INVENTION

1. Field of the Invention

The present invention relates to an algorithm for simply detecting a shoulder-line, and an efficient gesture spotting detection (GSD) employing the algorithm; and, more particularly, to a shoulder-line detecting method that can recognize a GSD calling gesture that occurs in a shoulder-line, head or higher part thereof in a remote distance or a short distance, although a user does not have a fixed posture, a gesture spotting detection method based on the shoulder-line detection, and an apparatus thereof.

2. Description of the Related Art

Recent development in robot technology speeds up the manufacturing and propagation of home-service robots that can provide diverse home-service services. The services that can be provided by the home-service robots reach more complicated and high-dimensional fields due to advancement in the technology of related fields.

Commands are made to the home-service robots by voice or gesture. In an environment with lots of noise or when a user has a speech defect or he/she uses a foreign language, it is difficult to make a command to the robot efficiently. In an effort for efficient interaction between a human being and a computer, researchers have been studying human gesture recognition, particularly, hand gesture of a human being.

The gesture recognition of a robot through a vision sensor is expected to occupy a significant part in communication between a user and a robot in a circumstance that speech information cannot be delivered or in cooperation with speech information. The gesture recognition necessitates an effective method that a robot discriminate a significant gesture from a meaningless gesture, which is made by the user to deliver his/her command to the robot.

Conventional technologies for analyzing gesture and behavior for a robot require to fix the posture of the user to resolve the problem related to the GSD, and the user should be so cooperative to maintain a fixed posture to make a command.

SUMMARY OF THE INVENTION

The present invention has been made to solve the foregoing problems of the prior art and it is therefore an aspect of the present invention to provide a gesture spotting detection method that can recognize a gesture spotting detection (GSD) calling gesture that occurs in a shoulder-line, head or higher part thereof in a remote distance or a short distance, although a user does not have a fixed posture, and an apparatus thereof.

Another aspect of the invention is to provide a shoulder-line detecting method that can detect a shoulder-line with a small amount of calculation on a computer based on a simple algorithm and be applied to a gesture spotting detection method and an apparatus thereof, and a shoulder-line detecting apparatus employing the same.

Yet another aspect of the invention is to provide a gesture spotting detection method that is not affected by a change in illumination, and a gesture spotting detection apparatus employing the same.

According to an aspect of the invention, there is provided a shoulder-line detecting method, which includes: receiving a photographed image of the object people; defining a body space area from the inputted photographed image; defining an external space area from the inputted photographed image based on the body space area; extracting an edge area from the inputted photographed image based on the body space area and the external space area; and acquiring shoulder-line information based on an energy function obtained by the body space area, the external space area, and the edge area.

According to another aspect of the invention, there is provided a gesture spotting detection (GSD) method, which includes: receiving a image of the object people, extracting a body space area, an external space area, and an edge area from the inputted photographed image, forming an energy function based on the body space area, the external space area, and the edge area, and acquiring shoulder-line information based on the energy function; tracing calling information among gestures of the people from the inputted image; when a calling gesture is made, checking whether the calling gesture is repeatedly made by the same person based on the shoulder-line information; and d) when the calling gesture is made by the same person repeatedly and a repetition frequency is larger than a predetermined threshold value, confirming the person as a calling user.

According to yet another aspect of the invention, there is provided a shoulder-line detecting apparatus, which includes: an image input module for receiving a image of the object people through an external vision sensor; a body space area defining module for detecting a body space area from the inputted image provided by the image input module; an external space area defining module for defining an external space area based on the inputted image provided by the image input module and the body space area provided by the body space area defining module; an edge area defining module for defining an edge area based on the body space area information and the external space area information; and a shoulder-line detecting module for detecting shoulder-line information based on a value that maximizes a ratio of the body space area to the external space area of the above defined body.

According to still another aspect of the invention, there is provided a gesture spotting detection apparatus, which includes: an image input block for receiving a image of the object people through an external vision sensor; a shoulder-line detecting block which includes a body space area defining module for detecting a body space area from the inputted image provided by the image input block, an external space area defining module for defining an external space area based on the inputted image provided by the image input block and the body space area provided by the body space area defining module, an edge area defining module for defining an edge area based on the body space area and the external space area, and a shoulder-line detecting module for detecting shoulder-line information based on a value that maximizes a ratio of the body space area to the external space area of the above-defined body; a calling gesture determining block for determining whether there is a calling gesture of a calling user based on the inputted image provided by the image input block and the shoulder-line information provided by the shoulder line detecting block; and a system calling block for, when a calling gesture is confirmed, confirming the calling user, waking up a gesture recognition system, and transmitting initial hand position information of the calling user to the gesture recognition system.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Figure 1:
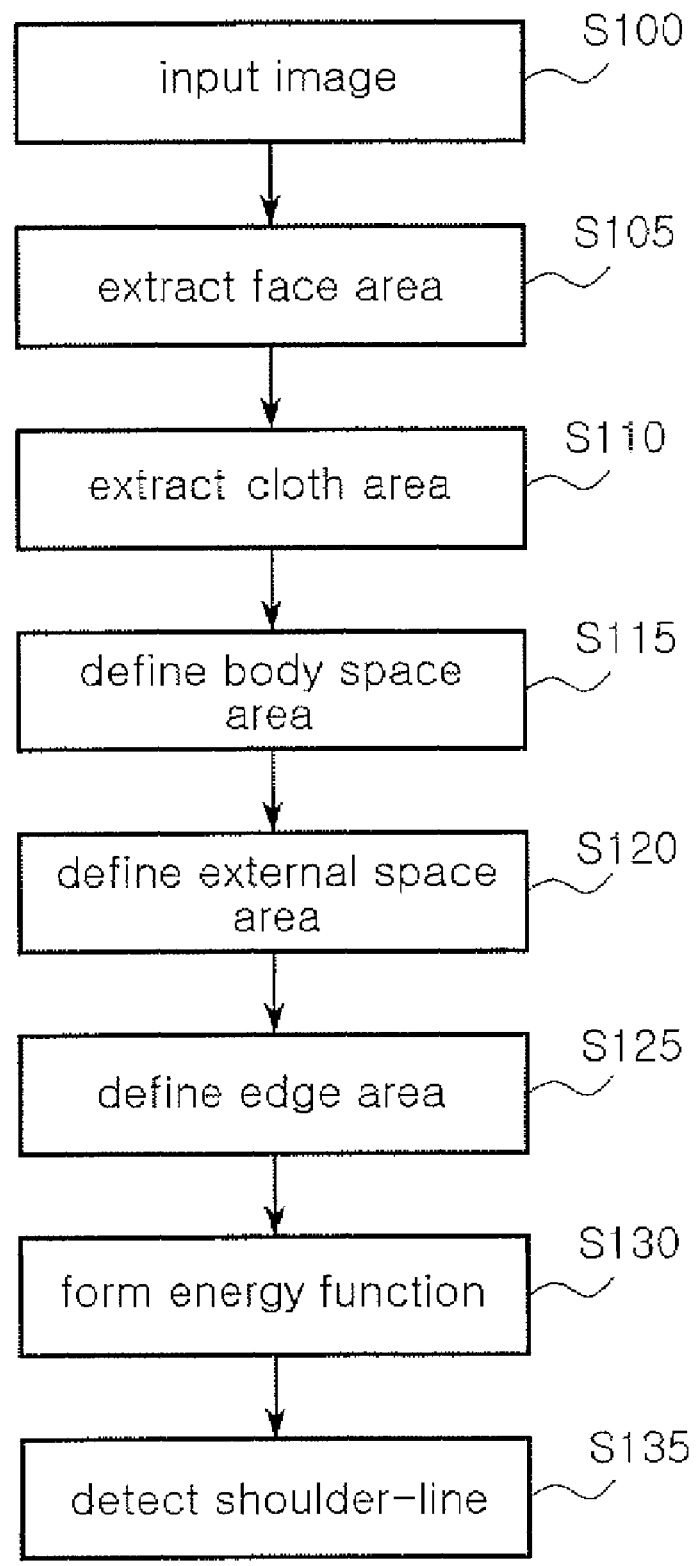
FIG. 1 is a flowchart describing a method for detecting a shoulder-line in accordance with an embodiment of the present invention.

Preferred embodiments of the present invention will now be described in detail with reference to the accompanying drawings. When is considered that detailed description on a related art may obscure the points of the present invention in describing the operation principle of the preferred embodiments of the present invention, the description will not be provided herein.

Also, the same reference numeral is used for a constituent element of a similar function or operation, although it appears in different drawings.

Hereinafter, a shoulder-line detecting method according to a first embodiment of the present invention will be described in detail with reference to FIGS. 1 and 2.

Figure 2:
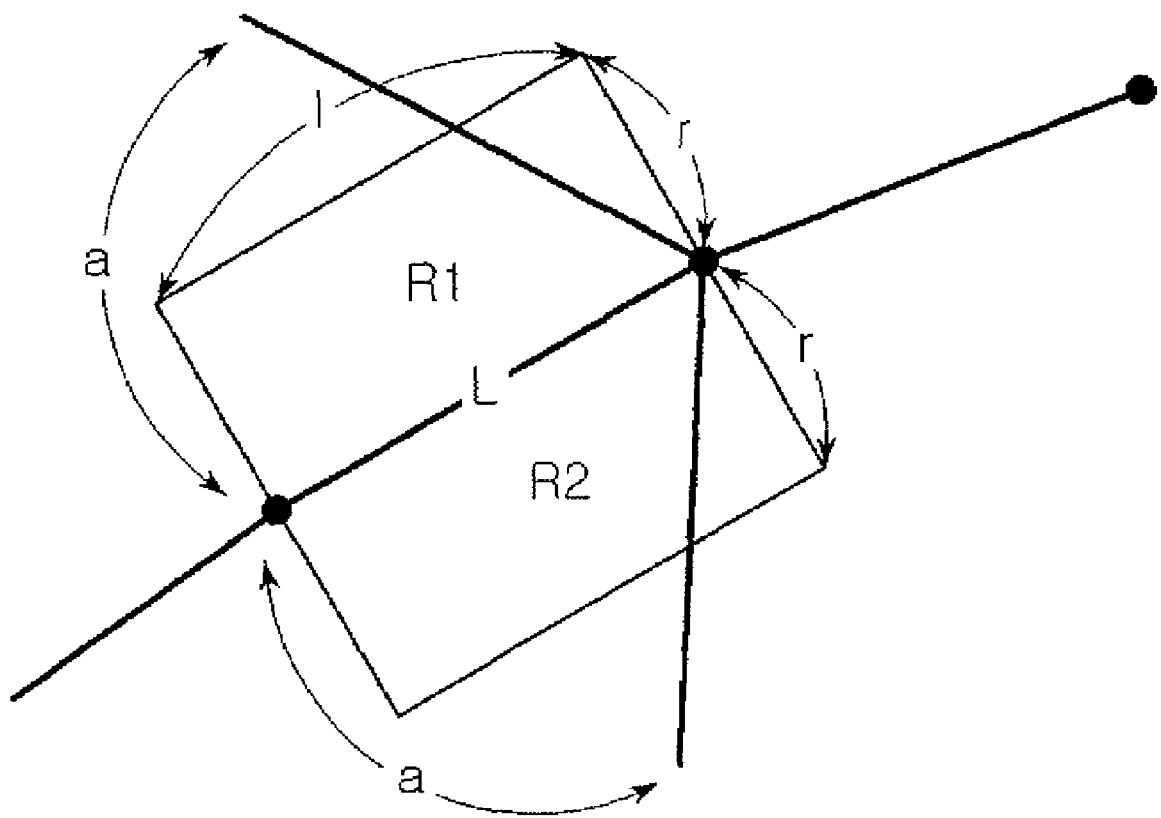
FIG. 2 is a view showing a relationship between a face area, a cloth area, and edge information which is defined through the shoulder line detecting process.

FIG. 1 is a flowchart describing a method for detecting a shoulder-line in accordance with an embodiment of the present invention, and FIG. 2 is a view showing a relationship between a face area, a cloth area, and edge information which is defined through the shoulder-line detecting process.

Referring to FIG. 1, at step S100, an image of the object people is obtained and inputted to detect a shoulder-line of a target person. At steps S105 and S110, the face area and cloth area of the object people are extracted from the inputted image. This is to exclude unnecessary areas from being searched to detect the shoulder-line of the target person by separating a body space area and an external space area, which is an area out of the body, from the inputted image information. Arm motion candidate area information can be obtained based on the body space area information.

At the step S105, a face area can be extracted based on Face Detection algorithm provided by OpenCV or by extracting an area including color information corresponding to skin color from the inputted image. Herein, it is desirable to use reference information modeled as the skin color of a human being to extract the color information corresponding to the skin color. Skin color information that can be desirably applied to the present invention is based on Peer's color model.

When the face area is detected from the inputted image at the step S105, at step S110, cloth color area information is extracted from the inputted image and a cloth area is detected based on the face area. First, the cloth color area information is extracted from the inputted image by using a color histogram backprojection method. An area apart from the face area detected in the above by a predetermined distance is determined as a cloth area. Herein, the cloth color information of an upper half of a body is modeled and traced along with the face information of the object people which is extracted before. Then, an HSV histogram is acquired from the upper half body area of the inputted image, and first, second and third-order statistics thereof are expressed in 9-dimensional. Thus, although a user moves while making a command, the command information can be maintained as it is.

When body space area information is acquired at step S115 through the steps S105 and S110, an external space area of a body is defined based on the body space area information at step S120. Subsequently, at step S125, edge area information is acquired from the image based on spatial gradient information of the image. Hereinafter, a process of defining the edge area will be described in detail with reference to FIG. 2.

FIG. 2 is a view showing a relationship between the face area, the cloth area, and the edge area, which are defined through the above steps. Referring to FIG. 2, the face area and the cloth area become an R2 area, which is the body space area, and the other area becomes an R1 area, which is an external space area. Herein, when the R2 area is determined to have a predetermined length (l) and width (r), the R1 area is determined to have the same length (l) and width (r) of the R2 area.

An area between the R1 area and the R2 area defines a boundary between the body and the external. Herein, 'a' denotes an angle that an edge branched out of an edge space (L) forms with respect to the edge space (L) when the edge rotates with its contact point to the edge space (L) at the center.

When the external space area R1, the body space area R2, and the edge area L are defined as shown in FIG. 2, at step S130, an energy function for extracting a shoulder-line is defined as Equation 1.

$$S = \left( \sum_{\forall x \in R2} f(x) - \sum_{\forall x \in R1} f(x) \right) / r + \sum_{\forall x \in L} f(x) \qquad \text{Eq. 1}$$

The shoulder-line can be detected by varying the angle and finding a value that makes the energy S the maximum. The angle ($\Theta_{max}$) can be acquired according to the following Equation 2 at step S135. Herein, I(x,y) signifies an intensity at a position (x,y).

$$\theta_{max} = \arg_\theta \left\{ \max \left\{ \sum_{i=1}^{l} I_s(x_k + i\cos\theta, y_k + i\sin\theta) \right\} \right\} \qquad \text{Eq. 2}$$

Figure 3:
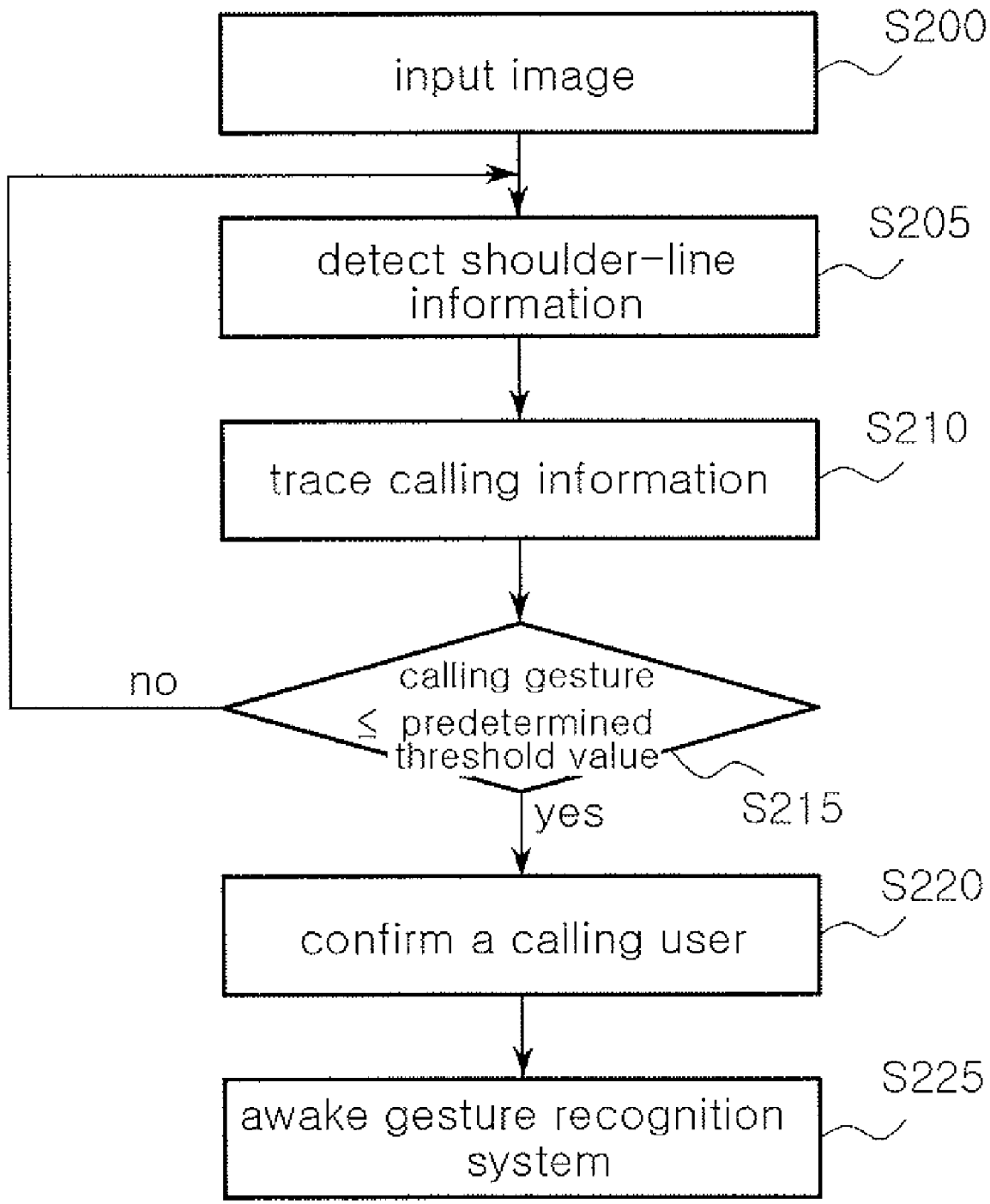
FIG. 3 is a flowchart describing a gesture spotting detection (GSD) in accordance with a second embodiment of the present invention.

The suggested gesture spotting detection according to a second embodiment of the present invention will be described with reference to FIG. 3, hereinafter. FIG. 3 is a flowchart describing a gesture spotting detection in accordance with a second embodiment of the present invention.

Referring to FIG. 3, at step S200, an image of the object people is obtained and the image is inputted for gesture spotting detection. Skin color information, cloth color information, and edge information are extracted to thereby form an energy function, and an angle that makes a ratio of a body space area to an external space area the maximum is obtained from the energy function to thereby detect shoulder-line information at step S205. These processes may be performed in the same or similar method as or to the first embodiment.

Subsequently, at step S210, calling information is traced in the image. Tracing the call information may include a process of checking whether there is a hand gesture and a process of checking whose hand it is that makes the calling gesture by the hand. This is to make sure that the calling gesture is made by the calling user and reduce the probability that the calling gesture or a motion of another person adjacent to the calling user is mistaken as a calling gesture of the calling user.

The hand gesture may be traced by a Mean Shift algorithm of the OpenCV. The Mean Shift algorithm is to find out a value $Y_c$ that makes a Mean Shift Vector $m_{h,G}(y_j)y_{j+1}-y_j$ '0' ($m_{h,G}(y_j)y_{j+1}-y_j=0$). Herein, $m_{h,G}(x)$ is expressed as the following Equation 3, where g denotes a kernel function, specifically, a Gaussian kernel.

$$m_{h,G}(x) = \frac{\sum_{i=1}^{n} x_i g\left(\left\|\frac{x-x_i}{h}\right\|^2\right)}{\sum_{i=1}^{n} g\left(\left\|\frac{x-x_i}{h}\right\|^2\right)} - x. \quad \text{Eq. 3}$$

Subsequently, it is checked whether the calling gesture is made by the calling user by tracing the calling information based on the shoulder-line information acquired in the previous procedure. In other words, it is possible to confirm that the calling gesture is made by the user's own body by acquiring a shoulder-line silhouette of the calling user and using the calling gesture and face information of the calling user.

When it is confirmed that the calling gesture is made by a predetermined user through the above processes, at step S215, it is checked whether the calling gesture is made repeatedly. This is to figure out whether the calling gesture is a mere motion or a calling gesture intended to make a command. Herein, to easily determine whether the gesture is a mere motion or a calling gesture, it may be established that when the gesture is repeated and a repetition frequency is larger than a predetermined threshold value, it is recognized as a calling gesture. Otherwise, when the repetition frequency is smaller than the threshold value, the gesture is regarded as a mere motion. Herein, the threshold value may be determined according to each of those skilled in the art because it may be different according to circumstances where the calling gesture is made.

Subsequently, when the calling gesture is repeated by the same person and the repetition frequency is larger than the threshold value, at step S220, the person is confirmed to be a calling user. Then, a gesture recognition system is awaked and the initial position of the hand is informed to the gesture recognition system at step S225.

Figure 4:
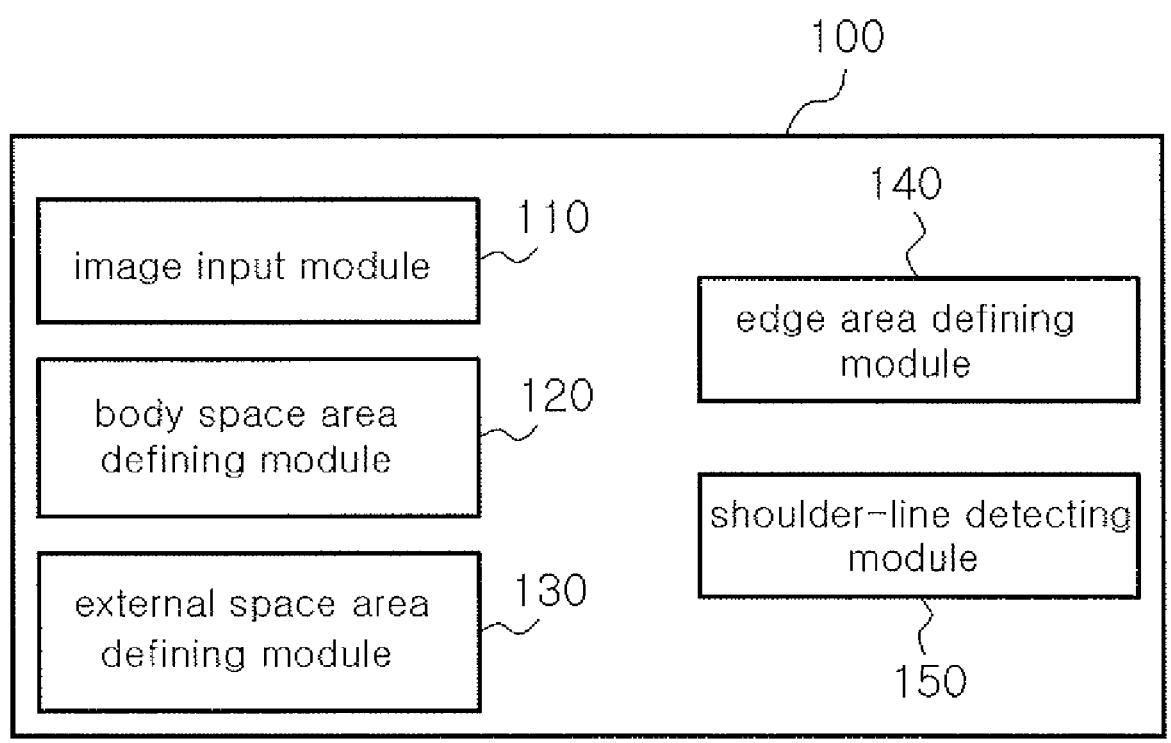
FIG. 4 is a block view showing a structure of a shoulder-line detecting apparatus in accordance with an embodiment of the present invention.

Hereinafter, a shoulder-line detecting apparatus suggested according to a third embodiment of the present invention will be described in detail with reference to FIG. 4. FIG. 4 is a block view showing a structure of a shoulder-line detecting apparatus in accordance with an embodiment of the present invention.

Referring to FIG. 4, the shoulder-line detecting apparatus 100 of the present embodiment of the invention includes an image input module 110, a body space area defining module 120, an external space area defining module 130, an edge area defining module 140, and a shoulder-line detecting module.

The image input module 110 receives a image of the object people from an image input device such as an external vision sensor.

The body space area defining module 120 extracts an area corresponding to the space of a human body from the image information transmitted from the image input module 110. For this, the body space area defining module 120 extracts a face area and a cloth area of an object person from the inputted image information and defines a body space area based on the face area and the cloth area.

The external space area defining module 130 defines an area corresponding to a space out of the human body based on the image information transmitted from the image input module 110 and the body space area information transmitted from the body space area defining module 120. The same area as the body space area may be defined as the external space area.

The edge area defining module 140 defines edge space information based on the information also defined by the body space area defining module 120 and the external space area defining module 130. In short, the edge area is an area between the body space area and the external space area and it defines edge space between the body space area and the external space area.

The shoulder-line detecting module extracts information on a shoulder-line, i.e., shoulder-line information, based on a value that maximizes a ratio of the above-defined body space area to the external space area. When R1 denotes a body space area including a face area and a cloth area and having a predetermined length (l) and a predetermined width (r); R2 denotes an external space area which is an area other than the body space area and having the same length (l) and width (r) of the body space area R1; an edge area (L) denotes an area between the body space area R1 and the external space area R2 and defining a boundary between the body and the outside of the body; and α denotes an angle which an edge branched out from an edge space (L) forms against the edge space when the edge rotates based on its contact point to the edge space (L), an energy function for detecting a shoulder-line is defined as the following Equation 1.

$$S = \left(\sum_{\forall x \in R2} f(x) - \sum_{\forall x \in R1} f(x)\right) / r + \sum_{\forall x \in L} f(x). \quad \text{Eq. 1}$$

The shoulder-line can be detected by varying the angle and finding a value that maximizes the energy S. The angle ($\Theta_{max}$) can be acquired based on the following Equation 2. Herein, I(x,y) signifies an intensity at a position (x,y).

$$\theta_{max} = \arg_\theta \left\{ \max\left\{\sum_{i=1}^{l} I_s(x_k + i\cos\theta, y_k + i\sin\theta)\right\}\right\}. \quad \text{Eq. 2}$$

Figure 5:
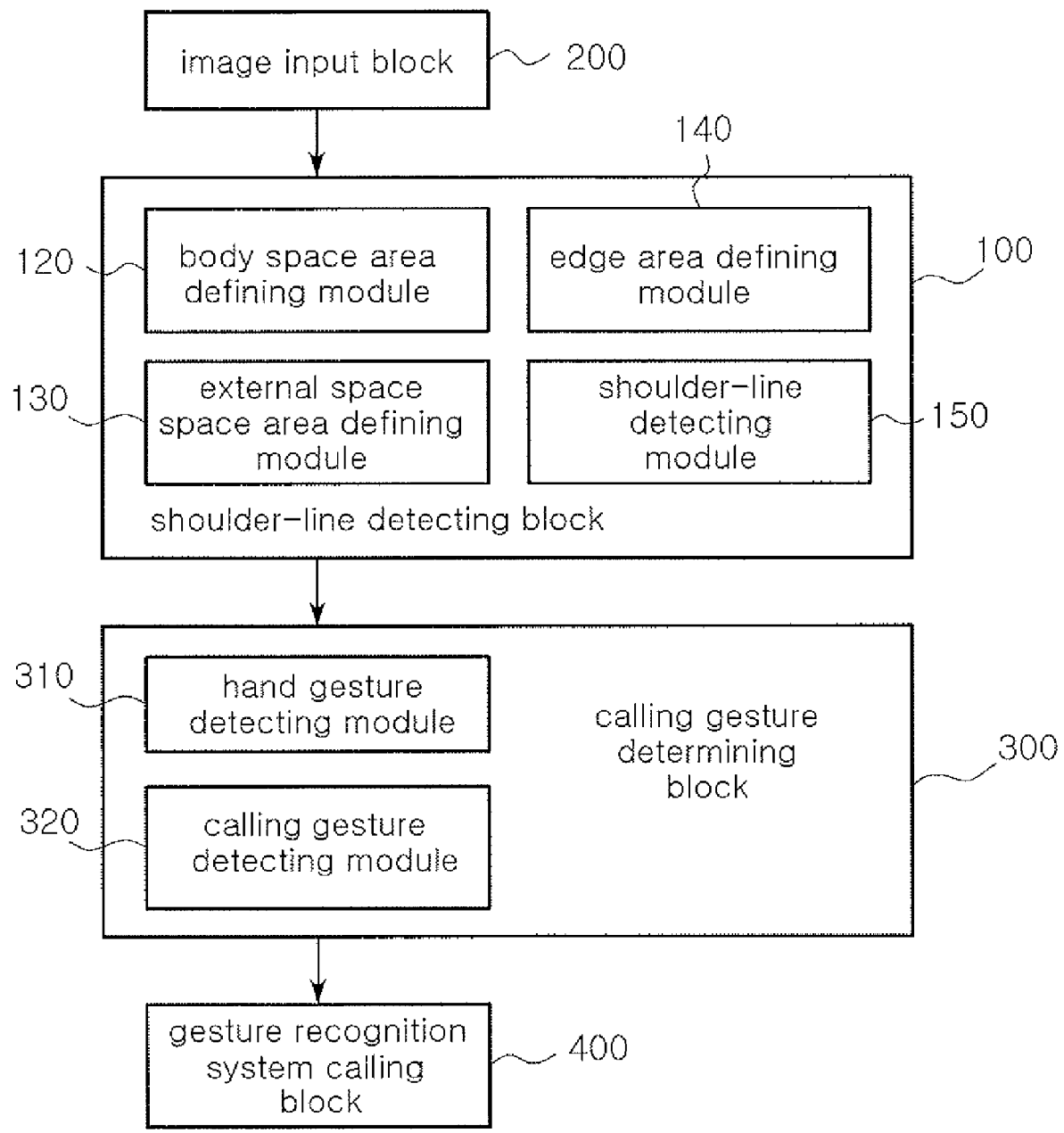
FIG. 5 is a block view illustrating a structure of a gesture spotting detection apparatus in accordance with an embodiment of the present invention.

The suggested gesture spotting detection apparatus according to a fourth embodiment of the present invention will be described with reference to FIG. 5, hereinafter. FIG. 5 is a block diagram describing a gesture spotting detection apparatus in accordance with an embodiment of the present invention.

Referring to FIG. 5, the gesture spotting detection apparatus includes an image input block 200, a shoulder-line detecting block 100, a calling gesture determining block 300, and a gesture recognition system calling block 400.

The image input block 200 receives a image of the object people from an image input device such as an external vision sensor.

The shoulder-line detecting block 100 extracts information on a shoulder-line of an object person based on the image information transmitted from the image input block 200. For this, the shoulder-line detecting block 100 includes a body space area defining module 120, an external space area defining module 130, an edge area defining module 140, a shoulder-line detecting module 150.

The body space area defining module 120 extracts an area corresponding to the space of a human body from the image information transmitted from the image input block 200.

The external space area defining module 130 defines an area corresponding to a space out of the human body based on the image information transmitted from the image input block 200 and the body space area information transmitted from the body space area defining module 120.

The edge area defining module 140 defines edge space information based on the body space area information and the external space area information.

The shoulder-line detecting module 150 extracts shoulder-line information based on a value that maximizes a ratio of the body space area to the external space area.

The calling gesture determining block 300 determines whether there is a calling gesture made by a calling user based on the shoulder-line information transmitted from the shoulder-line detecting block 100 and the image information transmitted from the image input block 200. For this, the calling gesture determining unit 300 is composed of a hand gesture detecting module 310 and a calling gesture detecting module 320. The hand gesture detecting module 310 determines whether a repeated action of the user is a hand gesture or not. The calling gesture detecting module 320 determines whose hand it is that makes the calling gesture and whether the repetition frequency of the calling gesture is larger than a predetermined threshold value.

When it is determined that the calling user has made a calling gesture, the gesture recognition system calling unit 400 identifies the user who has made the calling gesture, wakes up a gesture recognition system to figure out the intention of the calling user according to a gesture which is made after the calling gesture, and delivers information on the initial position of a hand of the calling user to the gesture recognition system.

The present invention provides a simple algorithm that can detect shoulder-line information of a user in a computer, a robot etc., with a small amount of calculation from image information inputted through an image input device, and makes it possible for a robot to recognize a calling gesture made by the shoulder, head or the upper part of calling user apart from a remote or close distance by figuring out the calling gesture of the user based on the algorithm, although the user does not have fixed posture.

The present invention further provides a computer-readable recording medium for storing a computer program that implements a method for detecting a shoulder-line for an efficient gesture spotting detection (GSD) employing an algorithm as described above.

While the present invention has been shown and described in connection with the preferred embodiments, it will be apparent to those skilled in the art that modifications and variations can be made without departing from the spirit and scope of the invention as defined by the appended claims.

What is claimed is:

1. A shoulder-line detecting method, comprising:
   receiving an image of a target person;
   defining a body space area from the received image;
   defining an external space area from the received image based on the body space area;
   extracting an edge area from a boundary area between the body space area and the external space area as the edge area; and
   calculating an energy value of the edge area while rotating an edge branched out from the edge area, based on the contact point of the branched edge and the edge area, and acquiring shoulder-line information from the branched edge when the energy value of the edge area is maximized, wherein the energy value of the edge area is maximized by determining an angle between the edge area and the branched edge that maximizes a ratio of the body space area to the external space area.

2. The shoulder-line detecting method according to claim 1, wherein the step of defining the external space area includes:
   detecting skin information of a person in the received image to detect a face area; and
   modeling cloth color information of the person whose face position from the received image determine the relative color region of the people's clothes.

3. The shoulder-line detecting method according to claim 2, wherein a Face Detection algorithm provided by OpenCV is used in the step of extracting the skin information.

4. The shoulder-line detecting method according to claim 2, wherein an area including skin color information is extracted from the received image and determined as a face area in the step of detecting the skin information.

5. The shoulder-line detecting method according to claim 4, wherein the skin color information is based on Peer's color model.

6. The shoulder-line detecting method according to claim 2, wherein the cloth color information is extracted from the received image and a cloth area is detected by performing a color histogram backprojection onto the image based on the above-detected face area in the step of modeling the cloth color information.

7. The shoulder-line detecting method according to claim 2, wherein cloth color information of an upper half body is modeled and traced along with the face information of the people, and an HSV histogram is obtained in the upper half body area of the image to thereby represent first, second and third-order statistic values thereof in a 9-dimensional arrangement in the step of modeling the cloth color information.

8. The shoulder-line detecting method according to claim 1, wherein the external space area is defined as an area having the same length and width as the body space area, which is defined in the defining of a body space, and in the step of defining the external space.

9. The shoulder-line detecting method according to claim 1, wherein edge area information is acquired from the received image based on spatial gradient information of the received image in the step of extracting the edge area.

10. The shoulder-line detecting method according to claim 1, wherein a boundary area between the body space area and the external space area is defined as an edge area in the step of extracting the edge area.

11. The shoulder-line detecting method according to claim 1, wherein in the step of acquiring the shoulder-line information, when the energy function for detecting a shoulder-line is defined as the following Equation 1:

$$S = \left(\sum_{\forall x \in R2} f(x) - \sum_{\forall x \in R1} f(x)\right)/r + \sum_{\forall x \in L} f(x) \qquad \text{Eq. 1}$$

where R1 denotes a body space area including a face area and a cloth area and having a predetermined length (l) and a predetermined width (r); R2 denotes an external space area which is an area other than the body space area and having the same length (l) and width (r) of the body space area R1; an edge area (L) denotes an area between the body space area R1 and the external space area R2 and defining a boundary between the body and the outside of the body; and a denotes an angle which an edge branched out from the edge area (L) forms against the edge area when the edge rotates based on its contact point to the edge area (L), the angle ($\Theta_{max}$) that maximizes an energy S is acquired by varying the angle a and based on the following Equation 2:

$$\theta_{max} = \arg_\theta \left\{ \max \left\{ \sum_{i=1}^{l} I_s(x_k + i\cos\theta, y_k + i\sin\theta) \right\} \right\} \qquad \text{Eq. 2}$$

where l(x,y) signifies an intensity at a position (x,y).

12. A non-transitory computer-readable recording medium for storing a computer program that implements a method for detecting a shoulder-line, comprising:
receiving an image of a target person;
defining a body space area from the received image;
defining an external space area from the received image based on the body space area;
extracting an edge area from a boundary area between the body space area and the external space area as the edge area; and
calculating an energy value of the edge area while rotating an edge branched out from the edge area, based on the contact point of the branched edge and the edge area, and acquiring shoulder-line information from the branched edge when the energy value of the edge area is maximized, wherein the energy value of the edge area is maximized by determining an angle between the edge area and the branched edge that maximizes a ratio of the body space area to the external space area.

13. A shoulder-line detecting apparatus, comprising:
a computer processor;
an image input module for receiving an image of a target person through an external vision sensor;
a body space area defining module for detecting a body space area from the received image provided by the image input module;
an external space area defining module for defining an external space area based on the received image provided by the image input module and the body space area provided by the body space area defining module;
an edge area defining module for defining an edge area based on the body space area information and the external space area information; and
a shoulder-line detecting module for calculating an energy value of the edge area while rotating an edge branched out from the edge area, based on the contact point of the branched edge and the edge area, and acquiring shoulder-line information from the branched edge when the energy value of the edge area is maximized, wherein the energy value of the edge area is maximized by determining an angle between the edge area and the branched edge that maximizes a ratio of the body space area to the external space area.

14. The shoulder-line detecting apparatus according to claim 13, wherein the body space area defining module extracts a face area and a cloth area from the received image obtained in the image input module, and defines a body space area based on the face area and a cloth area.

15. The shoulder-line detecting apparatus according to claim 13, wherein the edge area defining module defines the edge space area as a boundary area between the body space area and the external space area.

16. The shoulder-line detecting apparatus according to claim 13, wherein when the energy function for detecting a shoulder-line is defined as the following Equation 1:

$$S = \left(\sum_{\forall x \in R2} f(x) - \sum_{\forall x \in R1} f(x)\right)/r + \sum_{\forall x \in L} f(x) \qquad \text{Eq. 1}$$

where R1 denotes a body space area including a face area and a cloth area and having a predetermined length (l) and a predetermined width (r); R2 denotes an external space area which is an area other than the body space area and having the same length (l) and width (r) of the body space area R1; an edge area (L) denotes an area between the body space area R1 and the external space area R2 and defining a boundary between the body and the outside of the body; and a denotes an angle which an edge branched out from the edge area (L) forms against the edge area when the edge rotates based on its contact point to the edge area (L), the shoulder-line detecting module acquires the shoulder-line information by varying the angle a and obtaining the angle ($\Theta_{max}$) that maximizes an energy S based on the following Equation 2:

$$\theta_{max} = \arg_\theta \left\{ \max \left\{ \sum_{i=1}^{l} I_s(x_k + i\cos\theta, y_k + i\sin\theta) \right\} \right\} \qquad \text{Eq. 2}$$

where l(x,y) signifies an intensity at a position (x,y).

* * * * *